March 13, 1962   F. E. SWAIN   3,025,035
VALVE
Original Filed Jan. 5, 1955
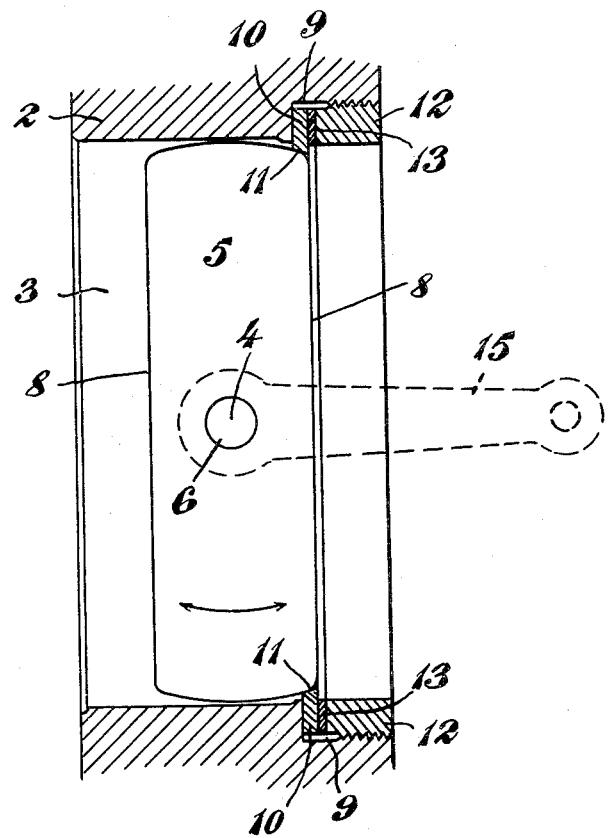
INVENTOR
Frank Edward Swain
By Norris & Bateman
ATTORNEYS

United States Patent Office 3,025,035
Patented Mar. 13, 1962

3,025,035
VALVE
Frank Edward Swain, 9 Kirkstone Close, Glenfield Frith Drive, Leicester, England
Continuation of abandoned application Ser. No. 479,923, Jan. 5, 1955. This application May 12, 1960, Ser. No. 29,556
Claims priority, application Great Britain Feb. 16, 1954
8 Claims. (Cl. 251—306)

This invention relates to an improved valve of the kind known as a butterfly valve, wherein a circular closure member is mounted for rocking movement about a diametrical axis in the bore of a valve body incorporating a seating against which the closure member abuts to close the valve.

The object of the present invention is to provide a valve of this kind of simple construction which provides for the substantially fluid-tight engagement of the closure member with an annular seating without the necessity for moving the closure member axially within the bore of the valve body.

Referring to the accompanying drawing, a part sectional longitudinal elevation of a valve according to the present invention is shown.

According to a convenient embodiment of the present invention as shown upon the accompanying drawing, the valve body 2 has a cylindrical bore 3 therethrough within which on a diametrically extending axis 4 is pivotally mounted a part-spherical closure disc member 5 of slightly less diameter than that of the bore 3 through the valve body 2.

This closure member 5 is of a shape which is the equivalent of a sphere from which has been cut in two parallel planes two equal and similar segments, and is provided with trunnions or a spindle 6, the ends of which project from the periphery of the closure member 5 at diametrically opposite points equidistant from and parallel to the two flat faces 8 of the member 5.

Mounted within an annular circumferentially extending recess 9, in the bore 3 of the valve body 2, in a plane off-set from the axis of rotation of the valve closure member 5 in the direction of the axis of the bore 3 through the valve body 2, is a seating 10 in the form of a ring, the inner periphery or mouth of which is bevelled to an angle as shown at 11 to co-operate with the periphery of the closure member 5 in a manner which will be described. Said ring member 10 is inherently resilient to permit radial expansion when engaged by the closure member 5 and in the case of a large valve may consist of a continuous resilient ring which will readily expand by virtue of the ability to stretch of the peripheral extent of the ring.

The recess 9 in the internal periphery of the valve body 2 is desirably formed by enlarging the bore 3 in the valve body 2 at one end, screw threading its internal periphery and then introducing into this end an externally screw threaded sleeve 12, the internal periphery of which is of an equal diameter to the internal diameter of the major portion of the bore 3 through the valve body 2 to permit rotation of the closure member 5 within the sleeve and radial expansion of the seating 10 within the recess 9, the length of the sleeve 12 being less than the actual length of the enlarged portion of the bore, so as to leave between the inner end of the sleeve 12 and the annular valve seating 10 a space in which is located a face seating washer member 13.

It will be understood that the removable sleeve 12 permits of the ready introduction of the valve seating ring 10 into the recess 9 and also permits of an adjustment of the width of the recess 9 in a direction parallel to the axis of the bore 3 through the valve body 2, in the event of wear.

By virtue of the fact that the seating 10 is off-set in the direction of the axis of the bore 3 of the valve body from the axis 4 of rotation of the valve closure member 5, when the valve is open and the plane of the valve closure member 5 is substantially parallel to the axis of the bore 3, only those portions of the valve closure member 5 adjacent to the bearings 6 are in contact with the seating 10. As the valve closure member 5 is rotated, the periphery of the closure member is progressively brought into engagement with the seating ring 10 and the parts of the periphery of the seating ring 10 furthest from the bearings of the valve closure member 5 are contacted by the corners of the valve closure member 5 between its convex periphery and its flat faces 8. In order to form a lead so as to assist the entry of the closure member 5 into the mouth of the seating ring 10, the corners between the periphery of the closure member 5 and the flat faces 8 thereof are rounded off to a radius less than the radius of the periphery As aforesaid the mouth of the ring 10 is bevelled. Preferably the bevel produces a conical mouth which is tangential to the surface of the closure member in its closed position so as to provide substantially line contact between the ring and the closure member. Alternately the ring mouth can be bevelled in spherical manner so as to have surface contact with the closure member.

Since the annular seating ring 10 is inherently resilient within the elastic limits of the material thereof, owing to the developed peripheral length of the ring being appreciable in relation to its diameter, the ring is capable of a high degree of stretch or resilience whereby an effective seating is provided between the closure member 5 and the seating ring 10.

Ring 10, which is resiliently expensible and contractible, has an inner periphery or mouth that is slightly smaller in diameter in its unstrained condition than the diameter of the external periphery of said disc 5, so that as the disc 5 progressively engages ring 10 during valve closing movement the ring is forced to expand radially to accommodate the periphery of the disc and when the valve is closed the ring 10 resiliently conforms to and elastically grips the peripheral surface of disc 5 in sealing manner.

It will be appreciated that the pressure of the seating ring 10 about the periphery of the closure member 5 is governed by the elasticity of the ring 10 and is substantially independent of fluid pressure upon the closure member with the result that the valve can be designed to give a light though sufficient sealing pressure of the ring about the closure member together with ease of opening or cracking the valve against high fluid pressure on the closure member, and to produce low wear between the rubbing surfaces of the ring and closure member.

The aforesaid construction further offers the advantage that by virtue of the ability of the ring 10 to freely radially move in its recess 9 in the valve body the ring can be co-axially aligned with the closure member despite small variations in the dimensions of the valve components due to manufacturing tolerances. Further the sealing ring is able to expand with thermal expansion of the closure member so that the valve remains effective over a wide range of temperatures.

The rotary movement imparted to the valve closure member 5 is effected by a lever 15 externally of the valve body 2 and mounted on one trunnion or the spindle 6 and is normally limited to movement through 90°. However, should wear obtain in the periphery of the valve closure member, means is provided to admit of turning the closure member through 180° and then relimiting movement to 90° through a 90° arc adjacent the initial 90° arc.

I claim:

1. A butterfly valve comprising a valve body having a bore, a closure member pivotally mounted in said bore about an axis extending across said bore and having an annular periphery that is essentially a convexly curved surface of revolution about the axis of said bore, said valve bore having a recess that opens inwardly in surrounding relationship to the axis of said bore, an axially supported radially resilient continuous ring having an outer diameter smaller than that of said recess freely mounted for radial movement in said recess, the inner periphery of said ring being slightly smaller in diameter than said periphery of said closure member and the relationship between the diameter of the inner periphery of said ring and the periphery of said closure member being such that said ring is peripherally stretched as the closure member enters into engagement with it during closing movement in the valve, said ring thereby resiliently conforming to and elastically gripping in sealing manner the peripheral surface of said closure member in valve closed position, the entire external periphery of said ring being sufficiently spaced apart from the bottom of said recess in its unstretched condition to provide for free radial stretching of said ring during operation, and means for retaining said ring axially in said recess, said seat ring being offset relatively to the pivotal axis of said closure member along the direction of the axis of said bore.

2. A butterfly valve comprising a valve body having a bore, a closure disc pivotally mounted in said bore about an axis extending across said bore and having a substantially spherical curved outer peripheral seating surface, said valve body having an annular recess in surrounding relationship to the axis of said bore and offset relatively to the pivotal axis of said closure member along the direction of the axis of said bore, an axially supported radially resilient continuous ring disposed in said recess, the inner periphery of said ring being slightly smaller in diameter than said peripheral seating surface of said closure member and the relationship between the diameters of the inner periphery of said ring and the periphery of said closure member being such that said ring is peripherally stretched as the closure member enters into engagement with it during closing movement of the valve, said ring thereby resiliently conforming to and gripping in sealing manner the peripheral seating surface of the closure member in valve closed position, the entire external periphery of said ring being of sufficiently smaller diameter than the diameter of said recess and in spaced apart relationship to the bottom of said recess in unstretched condition to provide for free radial stretching of said ring during operation, and means for retaining said ring in position in said recess axially of the bore of said valve body.

3. A butterfly valve comprising a valve body having a cylindrical bore, a closure disc pivotally mounted in said cylindrical bore on an axis substantially perpendicular to the axis of said bore and having a spherically curved annular periphery, said valve body having a recess in surrounding relationship to the axis of said bore and offset relatively to the pivotal axis of said closure member along the direction of the axis of said bore, an axially supported radially resilient thin section continuous ring disposed in said recess, the inner periphery of said ring being slightly smaller in diameter than said periphery of said closure disc and the relationship between the diameters of the inner periphery of said ring and the periphery of said closure member being such that said ring is peripherally stretched as the closure member enters into engagement with it during closing movement in the valve whereby said ring resiliently conforms to and elastically grips in sealing manner the peripheral surface of said closure member in valve closed position so as to form an effectively elastic seat for the periphery of said pivotally mounted closure member, the outer diameter of said ring being sufficiently smaller than the diameter of said recess in unexpanded condition to define an annular space between the bottom wall of said recess and the entire outer periphery of said ring so as to thereby provide for free radial expansion and stretching of said ring during operation, and means axially clamped adjacent the outer radially extending periphery of said ring for retaining said ring in said recess axially of said bore.

4. A butterfly valve comprising a body having a fluid passageway therethrough, a closure member having a substantially spherically curved annular periphery and pivoted to turn between valve open and closed positions about an axis transverse to the axis of said passageway, means providing an annular recess in said valve body in surrounding relationship to the axis of said passageway and axially offset to one side of the pivotal axis of said closure member, an axially supported resilient continuous seating ring disposed in said recess and having an inner periphery of said ring of such slightly smaller diameter relative to that of the periphery of said closure member that said ring is peripherally stretched as the closure member enters into engagement with it during closing movement in the valve, said ring thereby resiliently conforming to and elastically gripping in sealing manner the peripheral surface of said closure member in valve closed position so as to form an effectively elastic seat for the periphery of said closure member, the unexpanded outer periphery of said ring being of sufficiently smaller diameter than that of said recess so that the entire outer periphery of said ring defines a closed annular space with the walls of said recess to thereby provide for free radial expansion and stretching of the ring during operation, and means for axially retaining said ring in said body, said ring being bevelled on its inner periphery to engage with the peripheral surface of said closure member in closed position.

5. A butterfly valve comprising a valve body having a fluid transmitting bore, a closure member pivotally mounted in said bore about an axis extending across said bore and having an annular periphery that is an essentially convex surface of revolution about the axis of said bore, means in said bore downstream of said closure member mount for mounting a radially resilient continuous ring, said ring being offset relatively to the pivotal axis of said closure member along the direction of the axis of said bore, said ring being axially restrained but freely mounted for radial movement in the bore, the inner periphery of said ring being slightly smaller in diameter than said periphery of said closure member and the relationship between the diameter of the inner periphery of said ring and the periphery of said closure member being such that said ring is peripherally stretched as the closure member enters into engagement with it during closing movement in the valve, said ring thereby resiliently conforming to and elastically gripping in sealing manner the peripheral surface of said closure member in valve closed position and the entire external periphery of said ring being sufficiently spaced apart from the surrounding bore in its unstretched condition to provide for free radial stretching of said ring during operation.

6. A butterfly valve comprising a valve body having a fluid transmitting bore, a closure member pivotally mounted in said bore about an axis extending across said bore and having an annular periphery that is an essentially convex surface of revolution about the axis of said bore, said means in said bore downstream of said closure member mount for mounting a radially resilient continuous ring having a bevelled seating surface on the side facing said closure member, said ring being offset relatively to the pivotal axis of said closure member along the direction of the axis of said bore, said ring being freely mounted for radial movement in the bore, the inner periphery of said ring being of slightly smaller diameter than said periphery of said closure member and the relationship between the diameter of the inner periphery of said ring and the periphery of said closure member being such that said ring is peripherally stretched as the closure member enters into engagement with said seating surface during closing movement in the valve, said ring thereby resiliently conforming to and elastically gripping in sealing manner the peripheral surface of said closure member in valve closed position, the entire external periphery of said ring being sufficiently spaced apart from the surrounding bore in its unstretched condition to provide for free radial stretching of said ring during operation, and means for retaining said ring axially in said bore.

7. A butterfly valve comprising a valve body having a fluid transmitting bore, a rigid closure member pivotally mounted in said bore about an axis extending across said bore and having an annular periphery that is essentially a convexly curved surface of revolution about the axis of said bore, means in said bore downstream of said closure member mount for mounting an axially thin radially resilient continuous ring, said ring being offset relatively to the pivotal axis of said closure member along the direction of the axis of said bore, said ring being axially restrained but freely mounted for radial movement in the bore, the inner periphery of said ring being of slightly smaller diameter than said periphery of said closure member and the relationship between the diameter of the inner periphery of said ring and the periphery of said closure member being such that said ring is peripherally stretched as the closure member enters into engagement with it during closing movement in the valve, said ring thereby resiliently conforming to and elastically gripping in sealing manner the peripheral surface of said closure member in valve closed position, the entire external periphery of said ring being sufficiently spaced apart from the surrounding bore in its unstretched condition to provide for free radial stretching of said ring during operation, and means for retaining said ring axially in said bore.

8. A butterfly valve comprising a valve body having a fluid transmitting cylindrical bore, a flat-sided closure disc pivotally mounted in said bore about an axis extending across said bore and having an annular periphery that is essentially a convexly curved surface of revolution about the axis of said bore, means in said bore downstream of said closure member mount for mounting a radially resilient axially thin continuous ring having a bevelled seating surface facing the disc, said ring being offset relatively to the pivotal axis of said disc along the direction of the axis of said bore, said ring being axially restrained but freely mounted for radial movement in the bore, the inner periphery of said ring being of slightly smaller diameter than said periphery of said closure disc and the relationship between the diameter of the inner periphery of said ring and the periphery of said closure member being such that said ring is slightly peripherally stretched as the closure member enters into engagement with it during closing movement in the valve, said ring thereby resiliently conforming to and elastically gripping in sealing manner the peripheral surface of said closure member in valve closed position, the entire external periphery of said ring being sufficiently spaced apart from the surrounding bore in its unstretched condition to provide for free radial stretching of said ring during operation, and means for retaining said ring axially in said bore.

References Cited in the file of this patent

UNITED STATES PATENTS

| Re. 17,022 | Wilson | July 3, 1928 |
| 2,789,785 | Woods | Apr. 23, 1957 |
| 2,893,682 | Hintzman | July 7, 1959 |

FOREIGN PATENTS

| 22,932 | Great Britain | of 1911 |
| 689,630 | Great Britain | of 1953 |

UNITED STATES PATENT OFFICE
CERTIFICATE OF CORRECTION

Patent No. 3,025,035                              March 13, 1962

Frank Edward Swain

It is hereby certified that error appears in the above numbered patent requiring correction and that the said Letters Patent should read as corrected below.

In the grant, lines 1 to 3, for "Frank Edward Swain, of Leicester, England," read -- Frank Edward Swain, of Leicester, England, assignor of one-half to David F. Wiseman & Sons Limited, of Birmingham, England, a British company, --; line 12, for "Frank Edward Swain, his heirs" read -- Frank Edward Swain, his heirs or assigns, and David F. Wiseman & Sons Limited, its successors --; in the heading to the printed specification, lines 3 to 4, for "Frank Edward Swain, 9 Kirkstone Close, Glenfield Frith Drive, Leicester, England" read -- Frank Edward Swain, Leicester, England, assignor of one-half to David F. Wiseman & Sons Limited, Birmingham, England, a British company --.

Signed and sealed this 7th day of August 1962.

(SEAL)
Attest:

ERNEST W. SWIDER                                                            DAVID L. LADD

Attesting Officer                                                                  Commissioner of Patents